United States Patent [19]

Bersche

[11] Patent Number: 4,607,869
[45] Date of Patent: Aug. 26, 1986

[54] KNOT TYING APPARATUS

[76] Inventor: Joe C. Bersche, 222 Urbana Dr., Blackwell, Okla. 74631

[21] Appl. No.: 700,174

[22] Filed: Feb. 11, 1985

[51] Int. Cl.⁴ .............................................. D03J 3/00
[52] U.S. Cl. ................................................... 289/17
[58] Field of Search ............................ 289/1.2, 1.5, 17

[56]     References Cited
     U.S. PATENT DOCUMENTS

| 2,502,751 | 4/1950  | Roberts | 289/17 |
| 2,716,036 | 8/1955  | Fenell  | 289/17 |
| 2,773,713 | 12/1956 | Smalley | 289/17 |
| 3,787,081 | 1/1974  | Macy    | 289/17 |
| 3,881,757 | 5/1975  | Guinther | 289/17 |

Primary Examiner—Louis K. Rimrodt

[57] ABSTRACT

An apparatus for tying a loop in a fish line which includes a rectangular plate having opposite pairs of edges. On one pair of opposite edges legs are pivotally attached so that they extend normal to the surface of the plate. On the end of the legs opposite the attachment, are located extensions having several steps for securing the string to be formed into a loop. On one of the remaining pairs of edges a third member is attached which has a pair of spaced clamps secured thereto for securing the string during the tying operation.

5 Claims, 4 Drawing Figures

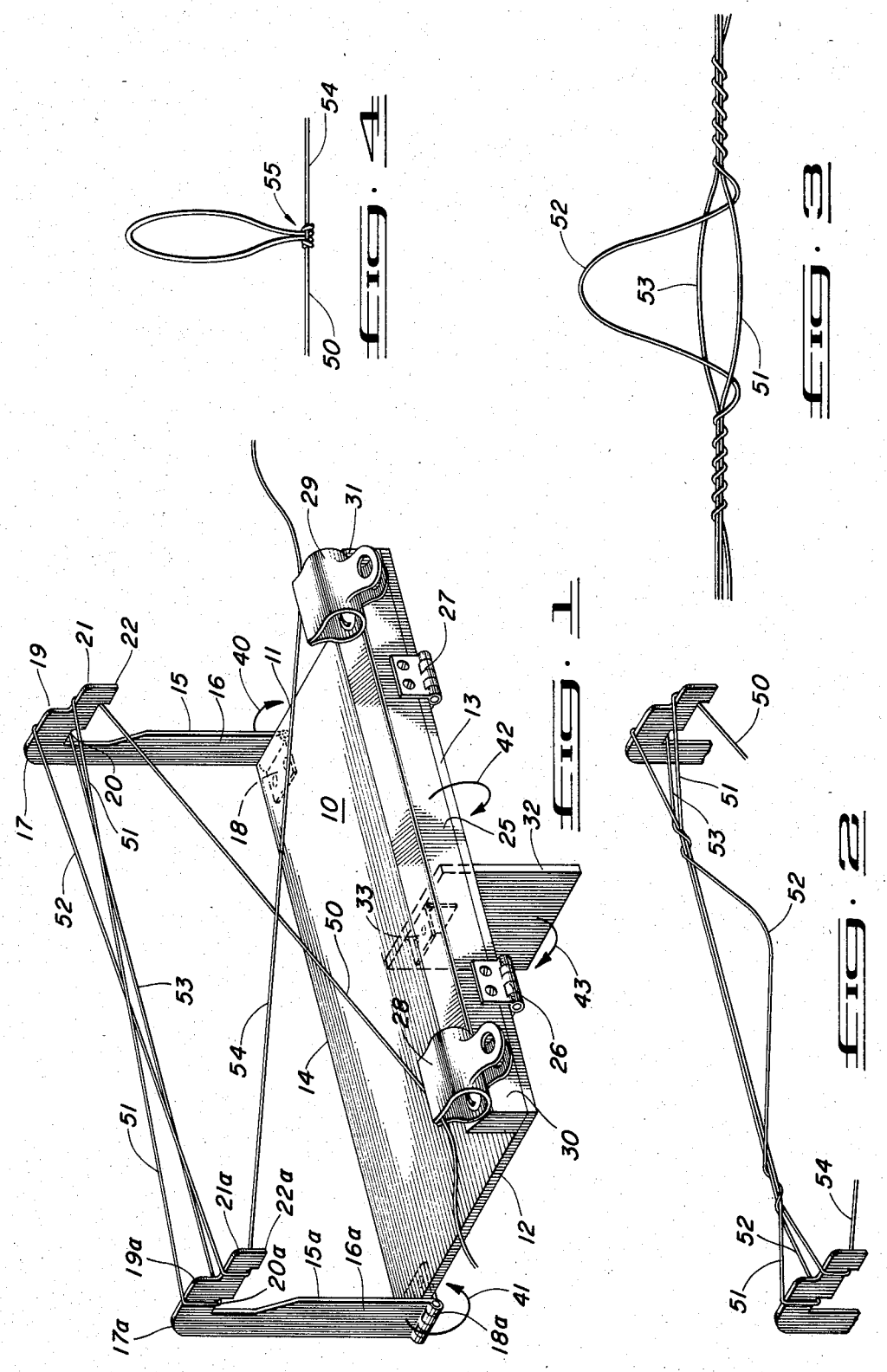

KNOT TYING APPARATUS

BRIEF DESCRIPTION OF THE INVENTION

This invention relates to an apparatus for tying a loop in a fish line. The apparatus basically comprises a retangular plate having opposite pairs of edges. On one pair of opposite edges, legs are pivotally attached so that they extend normal to the surface of the plate. On the end of the legs opposite the attachment are located extensions having several steps for securing the string to be formed into a loop. On one of the remaining pairs of edges a third member is attached which has a pair of space clamps secured thereto. The third member is likewise pivotally secured to the edge of the plate. On the underside of the plate, a holding means is attached for rigidly supporting the plate during the string tying operation.

BRIEF DESCRIPTION OF THE FIGURES

FIG. 1 is an orthogonal projection of the string tying apparatus, illustrating the proper position of the various elements during the string tying operation along with the initial position of the string;

FIG. 2 shows the means for forming the loop;

FIG. 3 shows the actual knot tying procedure for the loop and FIG. 4 shows the loop formed.

DETAILED DESCRIPTION OF THE APPARATUS

Referring to FIG. 1, a plate 10 has a first pair of opposite edges 11 and 12 and a second pair of opposite edges 13 and 14. A first leg referred to by arrow 15 has an first end 16 and a second end 17. End 16 is pivotally attached through a hinge 18 to edge 11 of plate 10, while end 17 of leg 15 has an extension 19 which has a notch 20 and a step 21 with an additional downward projection 22 for securing the various loops of string to be later discussed. A second leg 15a likewise has a first end 16a and a second end 17a with identical projection 19a which includes notch 20a, step 21a and downward projection 22a. A clamp securing member 25 is pivotally attached to edge 13 by means of hinges 26 and 27. A pair of clips 28 and 29 is secured to opposite ends 30 and 31 of clip attaching support member 25. A holding means 32 extends downwardly from plate means 10 on the underside of plate 10 and is attached by means of a hinge 33 to the underside of plate 10.

OPERATION

The apparatus operates as follows:

Initially legs 15 and 15a are pivoted in direction of arrows 40 and 41 for storage. In this manner, leg 15 and 15a will be pivoted around to the underside of plate 10 and legs 15 and 15a will then lie flat against the underside of plate 10. Likewise, clip support means 25 can pivot through hinges 26 and 27 to the underside of plate means 10 for storage as illustrated by arrow 42. In a like manner, holding member 32 can be pivoted in the direction of arrow 43 about hinge 33 so that it can be secured flat against the underside of plate 10.

When all members are properly secured, the apparatus has a substantially flat configuration. When the apparatus is desired to be used, then support 32 is pivoted downwardly about hinge 33 and legs 15 and 15a are pivoted about hinges 18 and 18a to the upright position as illustrated in FIG. 1. Edge 16a will abut edge 12a so that leg member 15a, for example, will not rotate pass the vertical position. Clip support means 25 can then be rotated around opposite the direction of arrow 42, so that it is position on top of plate means 10. A string is then clipped into clip 28, for example, and extends along 50, is wrapped around step 21 or projection 19 and is retained by downward projection 22. The string then extends along 51 until it is wrapped around notch 20a or projection 19a where it then extends as indicated by number 52 to notch 20 and around notch 20 then back to step 21a as illustrated by number 52. It is retained on step 21a by downward projection 22a. The string then extends along 54, where it is secured by the end of clip 29.

To make the knot, the string portion labelled 53 is then grasped and wrapped around strings 51 and 52, at least four times and preferably six times, in a wrapping motion, so that the string will be sufficiently wrapped around strings 52 and 51. String 53 is then passed between strings 52 and 51 as illustrated in FIG. 3. Once the string has passed between 53 and 51, then the knot is pulled so that it collapses together and forms a tightly secured knot as illustrated by arrow 55. Of course, in order to collapse the string to the knot formed in 55 (see FIG. 4), the string must first be removed from the notches 20 and 20a and steps 21 and 21a but should remain held by clips 29 and 28.

It is obvious that changes can be made in the particular apparatus, particularly the arrangement of the notches and steps and still be well within the scope of this invention. It is also understood that the pivotal legs 15 and 15a can be made secured to plate 10 and that the clip support means 25 does not have to fold nor does the holding plate 32. In fact, the entire apparatus can be made in the position shown in FIG. 1, and still be well within the scope of the invention as described in this invention and the appended claims.

What I claim is:

1. Apparatus for forming a loop in a string comprising,
   (a) a plate means having first and second opposite pairs of edges;
   (b) first and second members;
   (c) means for attaching said first and second members to said first pairs of opposite edges;
   (d) Extension means attached to said first and second members for securing loops of said string to be formed;
   (e) a third member attached to one of said remaining first and second pairs of opposite edges of said plate means; and,
   (f) spaced clip means attached to said third member;
   Whereby a string clipped in one of said clip means, and passed several times around said extension member and clipped to said remaining clip means is properly supported and positioned for tying.

2. Apparatus as described in claim 1 wherein said first and second members are attached by a hinge means so that said member can be folded for storage.

3. Apparatus as described in claim 2 wherein said third member is attached by a hinge means so that said third member can be folded for storage.

4. Apparatus as described in claim 1 wherein said extension means on said first and second members each include a first notch means for positioning one wrap of said string and at least a second edge portion for securing a second wrap on each of said extensions.

5. Apparatus as described in claim 1 including means for rigidly parallelly spacing said first and second members.

* * * * *